(12) United States Patent
Siemer et al.

(10) Patent No.: US 7,506,862 B2
(45) Date of Patent: Mar. 24, 2009

(54) ELASTOMER BUSH BEARING WITH AXIAL LIMIT STOP

(75) Inventors: Hubert Siemer, Dinklage (DE); Bernarda Holtze, Dinklage (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 375 days.

(21) Appl. No.: 11/179,810

(22) Filed: Jul. 12, 2005

(65) Prior Publication Data
US 2006/0012092 A1   Jan. 19, 2006

(30) Foreign Application Priority Data
Jul. 16, 2004  (DE) .................. 10 2004 034 632

(51) Int. Cl.
*F16F 5/00* (2006.01)
*F16M 13/00* (2006.01)

(52) U.S. Cl. .................. 267/141.3; 267/141; 267/293

(58) Field of Classification Search ............... 267/141, 267/293, 141.1, 141.2, 141.3, 141.4, 141.5; 248/573, 574; 384/247, 261
See application file for complete search history.

(56) References Cited

U.S. PATENT DOCUMENTS

| 4,139,246 | A | * | 2/1979 | Mikoshiba et al. | 384/222 |
| 4,575,114 | A | * | 3/1986 | Camp | 280/124.152 |
| 5,181,736 | A | * | 1/1993 | Kokubun | 280/124.109 |
| 5,820,115 | A | * | 10/1998 | Stevenson et al. | 267/293 |
| 6,170,812 | B1 | * | 1/2001 | Nicoles | 267/281 |
| 6,205,850 | B1 | * | 3/2001 | Wehrman et al. | 73/119 R |
| 6,488,151 | B2 | * | 12/2002 | Ramsey et al. | 206/378 |
| 6,854,723 | B2 | * | 2/2005 | Ogawa et al. | 267/293 |
| 2006/0012093 | A1 | * | 1/2006 | Siemer et al. | 267/293 |
| 2006/0290040 | A1 | * | 12/2006 | Kumper | 267/281 |

FOREIGN PATENT DOCUMENTS

JP    6235126 A  *  2/1987
JP    2309028 A  *  12/1990

* cited by examiner

*Primary Examiner*—Melody M Burch
(74) *Attorney, Agent, or Firm*—Norris, McLaughlin & Marcus; Christa Hildebrand (57) ABSTRACT

An elastomer bush bearing is disclosed with at least one axial limit stop. An elastomeric bush bearing is provided with a damping characteristic that can be adapted to the respective application and/or to changing preloads. The bearing is constructed in that a stop face formed on the bearing body and the opposing stop face, arranged on the inner sleeve or on a stop element supported by the inner sleeve, which can be rotated relative to each other in the circumferential direction of the bearing by an actuator or can be displaced relative to each other in the axial direction. The mutual separation between the stop faces determined by the gap changes simultaneously with a corresponding relative motion of the stop faces effected by a rotation of the actuator.

12 Claims, 6 Drawing Sheets

ELASTOMER BUSH BEARING WITH AXIAL LIMIT STOP

BACKGROUND OF THE INVENTION

1. Field of the Invention

The invention relates to an elastomer bush bearing with at least one axial limit stop, which limits the axial spring travel of the bearing body for spring compression for oscillations introduced into the bearing in the axial direction.

2. Description of the Related Art

It is known to equip bush bearings in automobiles, which are used, for example, for supporting the connecting rod of chassis suspensions, with limit stops of excursion limiters to limit the compression spring travel of the bearing body subjected to oscillations. This prevents excessive deformations or excessive elongation of the elastomeric bearing body from destroying the bearing. The limit stops, in particular in bearings with a soft spring characteristic, are typically designed so that the produced excursion limit is not abrupt, but starts out rather gradually. This is accomplished by fabricating the stop faces at least partially also from an elastomer. This also prevents annoying vibration effects and noise when the excursion limitation takes effect. The axial limit stops of a rubber bearing or an elastomer bush bearing of the aforedescribed type are formed by two stop faces which face each other in the axial direction and are spaced apart by a gap. The gap determines the free travel during spring compression of the elastomer bearing body, or the amount by which the rubber spring can expand until the excursion limitation takes effect. An operating range is defined for the bearing within the characteristic curve field describing the spring characteristics by specifying the possible spring excursion of the elastomer bearing body until the excursion limitation takes effect. In conventional devices, the stop elements of the excursion limiter are arranged on or in the bearing at a fixed location. If the preload acting on the bearing changes, for example when the vehicle load is increase, the operating range of the bearing disadvantageously shifts within the bearing damping curve toward the progressive branch of the spring characteristic. Stated differently, the free travel of the elastomeric bearing spring is reduced on the spring compression side, while the free travel is simultaneously increased on the spring rebound or expansion travel side. When the preload changes, the bearing no longer operates in a symmetric operating range, with reference to the defined total spring travel of the elastomeric spring, because the limit stop of the spring body is reached sooner in a spring compression direction than in the opposite direction. This results in a noticeable deterioration in the drive dynamics and the comfort of the vehicle.

SUMMARY OF THE INVENTION

It is therefore an object of the invention to form an elastomer bush bearing with a damping behavior that can be adapted to the corresponding application and/or to changing preloads.

The object is solved by a rubber bearing with the features recited in the independent claim. Advantageous embodiments or modifications of the rubber bearing of the invention are recited in the dependent claims.

The elastomer bush bearing proposed as a solution includes an inner sleeve, an elastomer bearing body, which preferably concentrically surrounds the inner sleeve and is connected with the inner sleeve by vulcanization, and an outer sleeve receiving the bearing body with the inner sleeve. At least one axial limit stop is formed on the bearing, which limits the axial compression spring travel of the bearing body when oscillations are introduced axially in the bearing. The axial stop is formed by two stop faces which face each other in the axial direction and are spaced apart by a gap. One of the stop faces is formed on the bearing body, while the other stop face is formed on the inner sleeve or on a stop element supported by the inner sleeve. According to the invention, the bearing is constructed so that the stop face formed on the bearing body and the opposing stop face can be rotated relative to each other in the circumferential direction of the bearing by an actuator or can be displaced relative to each other in the axial direction, wherein the mutual separation between the stop faces, as determined by the gap, changes simultaneously with a corresponding relative motion of the stop faces caused by a rotation of the actuator. The free travel of the bearing body during spring compression, when subjected to oscillations acting radially on the bearing, can be changed by changing the size of the gap or the distance between the stop faces. In this way, an increased preload, for example due to an increased load of a vehicle provided with the bearing, can be compensated by returning the increased gap and a resulting rotation or axial displacement of corresponding bearing parts on the spring compression side to their original size by rotating the actuator, thereby compensation for the shift in the operating point in the damping characteristic of the bearing caused by the increased preload. Likewise, a reduction in the preload can also be compensated. In addition to compensating for changes in the preload, the free travel of the bearing body can also be adapted in the axially positive and/or negative direction to the respective application of the bearing.

According to the invention, axial limit stops are arranged at the axial ends of the proposed bush bearing, which are designed so that the gap between the stop faces can be independently adjusted.

In the proposed embodiment of the bush bearing of the invention, adjustability of at least one axial stop is achieved by providing the inner sleeve with two cylindrical sleeve sections which slidingly engage with each other and are moveable relative to each other in the axial direction. Only one of the sleeve sections is joined to the bearing body through vulcanization. At the same time, at least one axial end of the other sleeve section, which can be displaced relative to the first sleeve section and hence also relative to the bearing body connected with the first sleeve section by rotating the actuator, includes a stop face, which in cooperation with an axially opposing stop face of the bearing body forms and axial limit stop. In a potential application of this embodiment, the sleeve section joined to the bearing body through vulcanization protrudes axially from the bearing body and has a circumferential groove or channel disposed at a constant axial height along at least a portion of its circumference. A pin arranged on the rotatable actuator is guided in the groove or channel, with the pin protruding through an opening which extends along a portion of the circumference of the other sleeve section. Unlike the groove in the first-mentioned sleeve section, the opening has a pitch in the axial direction and crosses the groove of the first sleeve section. This design and the simultaneous engagement of the aforementioned pin of the actuator which is driven, for example, by an electric motor enable relative axial displacement of the sleeve sections.

According to another embodiment of the bush bearing, which follows the same basic idea of the invention, a stop face with a saw tooth shape or wavy shape along the bearing circumference is formed on at least one of the axial end faces of the elastomer bearing body. The stop face forms an axial limit stop in cooperation with an opposing stop face, which is supported on a corresponding axial end of the inner sleeve and spaced from the first stop face by a gap. The stop face of the latter stop element corresponds to the stop face of the bearing body and has also a saw tooth shape or wavy shape in the circumferential direction. The stop element is movably connected to the inner sleeve by a sliding disk and/or sliding bushing and can be rotated by the actuator along the circumference of the inner sleeve. According to a preferred modification of this embodiment, the stop face formed on the stop element is made of an elastomer. As mentioned above, the actuator is operatively connected, preferably by a gear, with an electric motor that activates the actuator. According to a preferred embodiment of the invention, the electric motor and the actuator, which is operatively connected thereto, represent a portion of a control circuit. The preload applied to the bush bearing and the gap between the stop faces of the axial limit stop(s) (6, 6', 7, 7') is measured with sensors, and a controlled variable is derived therefrom in a processing unit. The electric motor activating the actuator is controlled by a controller in response to the controlled variable to adapt the spring travel to a changing preload.

The aforedescribed embodiments of the elastomer bush bearing can also be implemented as hydraulic bearings, whereby at least two chambers which are connected by a flow channel are formed in the bearing body for receiving a damping fluid. Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1A:
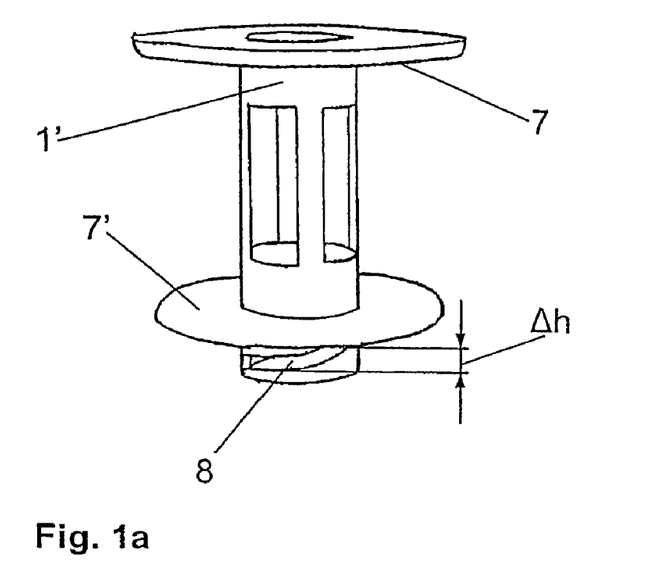
FIGS. 1a-1d: a three-dimensional view of essential components of a possible embodiment of the bush bearing according to the invention and the installed bearing.
Figure 1B:
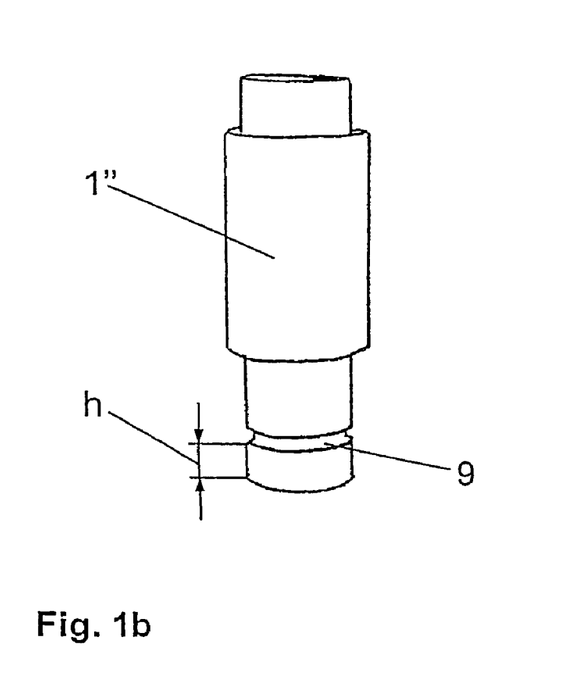
Figure 1C:
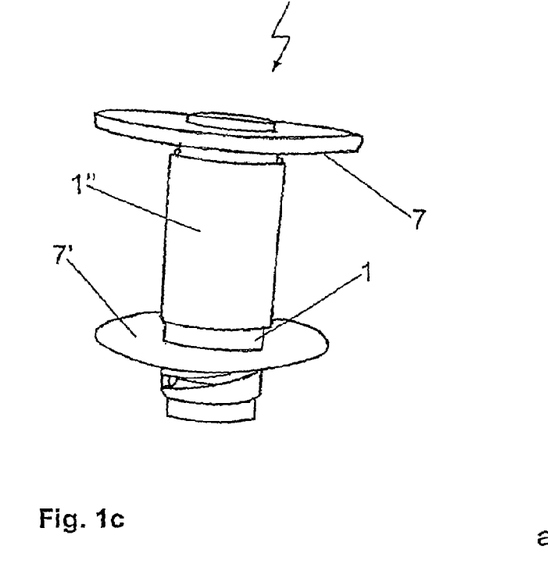
Figure 1D:
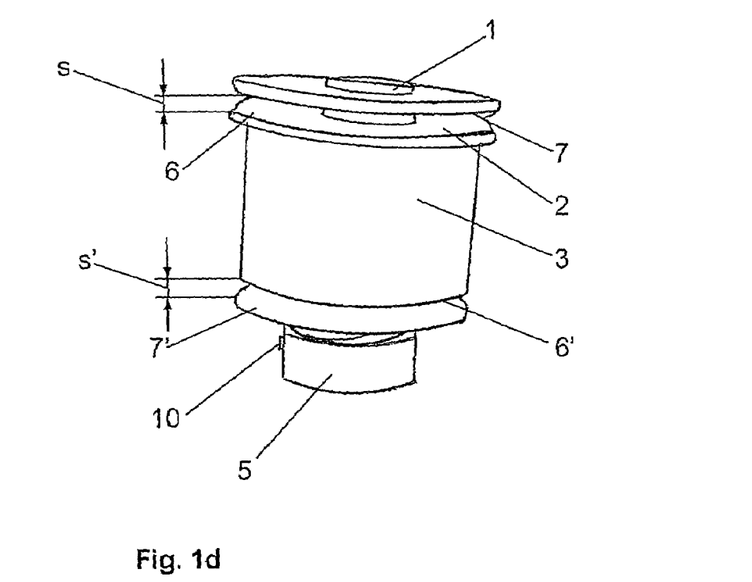

FIGS. 1a to 1d show an embodiment of the bush bearing according to the invention. The individual figures depict the essential components of the bearing and the manner in which they are connected. The depicted embodiment of a bush bearing includes a two-part inner sleeve 1. The inner sleeve 1, is constructed of a first sleeve section 1' shown in FIG. 1a, and a second sleeve section 1'', shown in FIG. 1b, which are brought into engagement in the assembled bearing, shown in FIG. 1c. The two sleeve sections 1', 1'' can move against each other in the axial direction by sliding inside one another. FIG. 1d shows the finished assembled bearing, where the two-part inner sleeve 1 is conventionally concentrically enclosed by an elastomer bearing body 2, which is joined to the inner sleeve 1 through vulcanization. The bearing body 2 and the inner sleeve 1 are received by an outer sleeve 3. On both axial ends of the bush bearing, axial stops, 6, 6', 7, 7' are formed as stop faces 6, 6', 7, 7', which face each other in the axial direction, namely stop faces 6, 6' on the bearing body 2 and stop faces 7, 7' of the sleeve section 1' of the inner sleeve 1. The axial stops 6, 6', 7, 7' limit the spring travel of the elastomer bearing body 2 in the axial direction α through contact between the stop faces 6, 7 and 6', 7', because the stop faces 6, 6' of the bearing body 2 are during spring deflection entrained in the direction of one of the stop faces 7, 7' of the section 1' of the inner sleeve 1. The size of the gap s, s' defines the free travel of the bearing body 2 in the positive and negative axial direction α. It is immaterial for the description of the bearing operation, which direction is referred to as the axial positive and axial negative direction, because such definition is only relative.

As seen in FIGS. 1a and 1b, the sleeve sections 1', 1'' have essentially the shape of a hollow cylinder. A circumferential groove 9 or channel is formed in the sleeve section 1'', with the groove 9 extending along the sleeve section 1'' at an axially constant height h or with a constant spacing from the axial end of the sleeve section 1''. An opening 8 is formed in the sleeve section 1'. The opening 8 extends over portions of the sleeve section 1' and is located, when the sleeve sections 1', 1'' are joined together, in the region of the groove 9 of the other section 1''. The opening 8 has a pitch Δh in the axial direction and hence crosses the groove 9 of the sleeve section 1''. When, as shown in FIG. 1d, a pin 10 of a rotatable actuator 5 penetrates the opening 8 and protrudes into the groove 9 of the sleeve section 1'', which is intended to guide the pin 10, then the two sleeve sections 1', 1'' are displaced against each other in the axial direction α during a rotation of the actuator 5. The axial displacement changes the dimensions of the gap s and/or s'.

Figure 2:
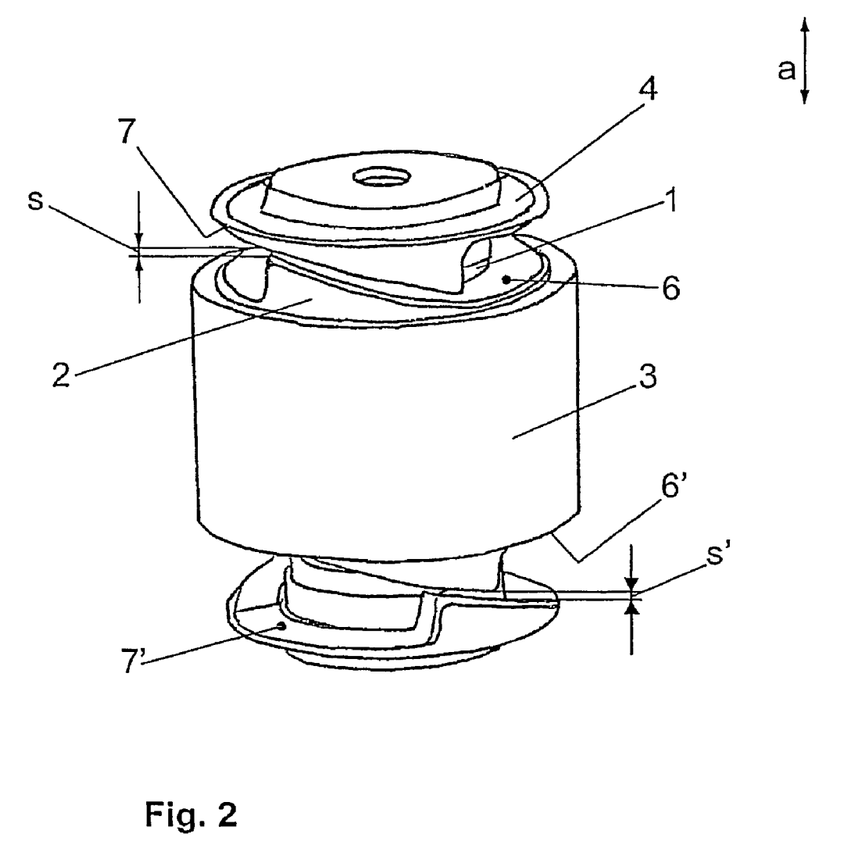
FIG. 2: another embodiment of the bush bearing according to the invention, also in a three-dimensional view.

FIG. 2 shows another possible embodiment of the bush bearing of the invention. The bearing has the aforedescribed construction, with a cylindrical inner sleeve 1, a bearing body 2 surrounding the inner sleeve and connected thereto by vulcanization, and an outer sleeve 3 receiving the aforementioned parts. Axial stops 6, 6', 7, 7' are disposed on both axial ends of the bush bearing, which are implemented by a corresponding stop face 6, 6' on the bearing body 2 and a stop face 7, 7' on a stop element 4, 4'. Both the stop faces 6, 6' on the bearing body 2 and the stop faces 7, 7' formed on the stop element 4, 4' have a saw tooth pattern. As can be seen, the free travel of the bearing body 2 or of the elastomer spring formed by the bearing body 2 in the respective axial direction is defined by the gap s, s' where the stop faces 6, 6', 7, 7' have the smallest separation. A component of the stop elements 4, 4' is a sliding disk 11, 11' (see FIG. 3), or a sliding disk (11, 11') and a sliding bushing 12, 12' (see FIG. 4), which enable the stop elements 4, 4' to move along the circumference of the inner sleeve 1. For example, to adapt to a changed preload, the stop elements 4, 4' can then be rotated in the circumferential direction relative to the bearing body 2 by an actuator (not shown in the drawing). The dimension of the gap s, s' and hence the damping characteristic can be changed over the operating range of the bearing for the axially applied dynamic oscillations. Those skilled in the art will appreciate that the stop elements 4, 4' can optionally also be rotated independently relative to the bearing body 2, 2' by designing the actuator 5 accordingly or by employing several actuators, which makes it possible to adjust the gaps s, s' independently.

Figure 3:
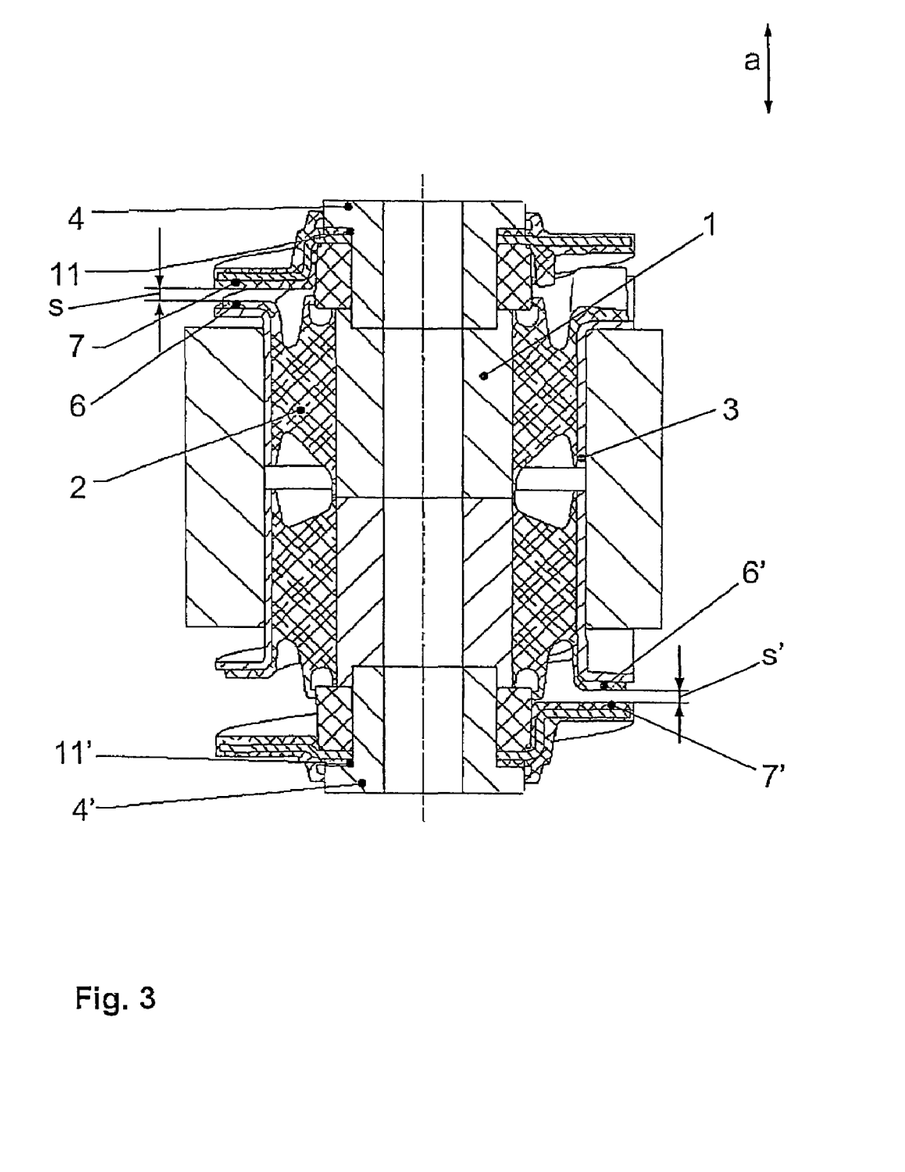
FIG. 3: a modification of the embodiment of FIG. 2 in a longitudinal cross-sectional view.
Figure 4:
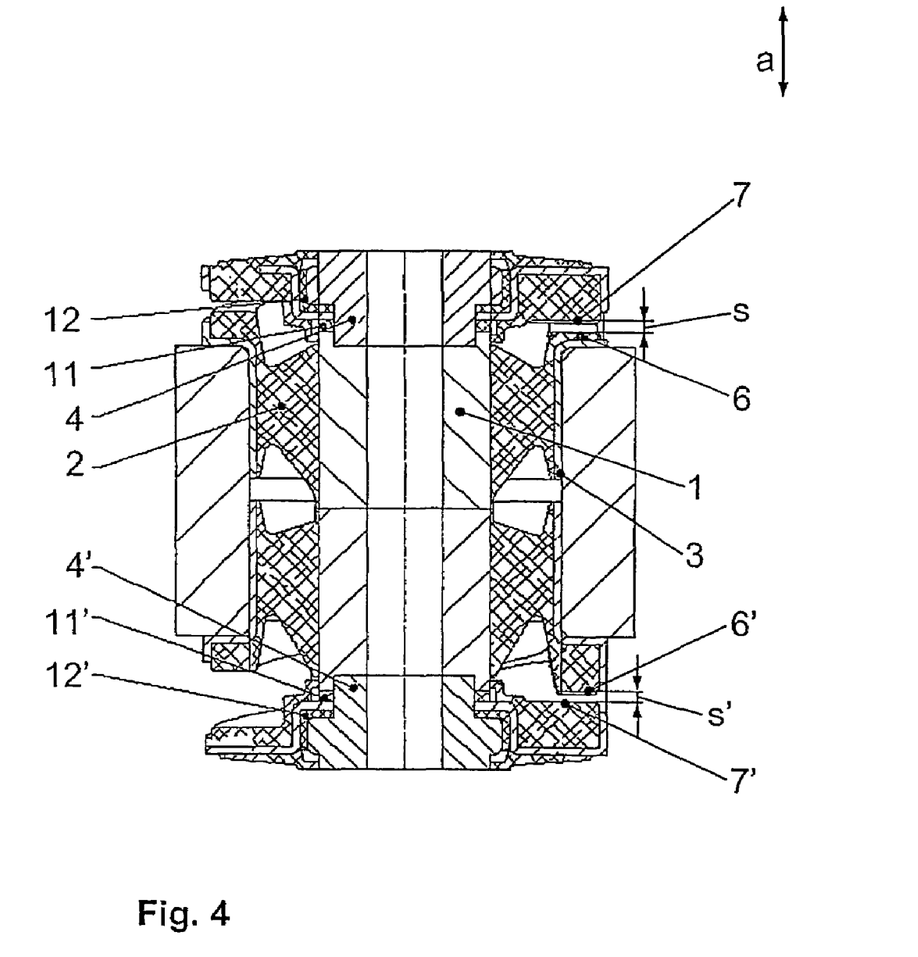
FIG. 4: another modification of the embodiment of FIG. 2 in a longitudinal cross-sectional view.
Figure 5:
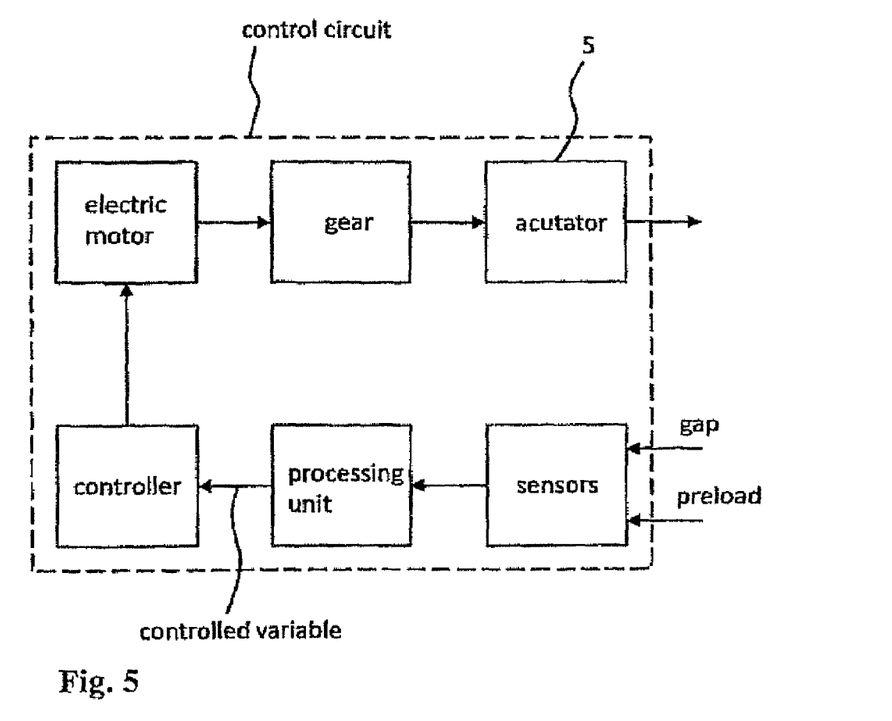
FIG. 5: the control circuit for controlling the actuator.
Figure 6:
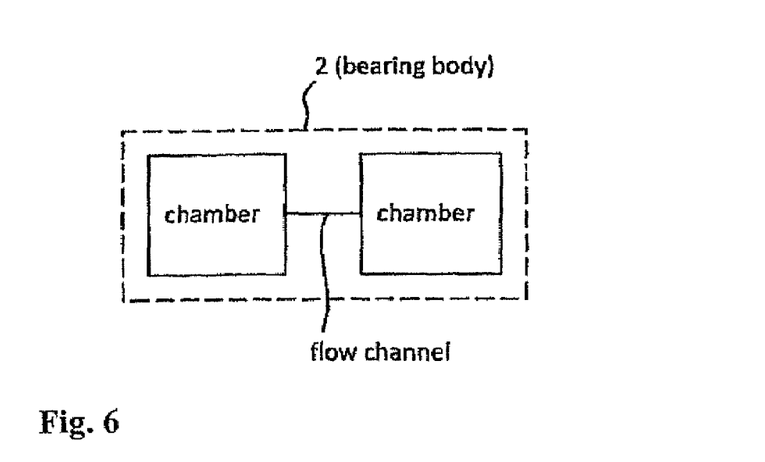
FIG. 6: the chambers of the bearing body connected by a flow channel.

The stop elements 4, 4' of the bearing according to FIG. 2 and their connection to the inner sleeve 1 can be implemented in different ways. This is indicated in FIGS. 3 and 4, which show in a longitudinal cross-sectional view different modifications of this basic embodiment. The stop elements 4, 4' in the modification shown in FIG. 3 are connected to the inner sleeve 1 and/or to the other bearing components so as to be movable in the circumferential direction, namely in the modification of FIG. 3 via sliding disks 11, 11', and in the modification of FIG. 4 via sliding bushings 12, 12' and sliding disks 11, 11'. The essential components of the bearing are clearly seen in the cross-sectional views of FIGS. 3 and 4, which show embodiment with an essentially identical functionality. The stop elements 4, 4' are rotated by an actuator (not shown in this embodiment), which engages with the stop elements 4, 4' and is operated preferably by an electric motor controlled by a control circuit, optionally with an interposed gear.

In another embodiment, which is the different from the embodiments illustrated above, in particular from the embodiment shown in FIG. 2, the stop faces can also be formed as opposing conical faces, with for example the stop faces 7, 7' of the stop elements 4, 4' inclined outwardly and the corresponding stop faces 6, 6' of the bearing body 2 inclined inwardly. In this way, the stop faces 6, 7, 6', 7' limit the spring travel of the bearing body 2 or of the spring formed by the bearing body in the axial as well as in the radial direction. Accordingly, a bush bearing can be implemented wherein the axial and radial limit stops, which determine the respective free travel of the elastomer spring 2, can be adjusted to follow a change in the preload.

The implementation of the bearing body 2 and the inner sleeve 1 in the embodiments shown in FIGS. 3 and 4 as two parts is, different from the embodiment of FIG. 1, primarily dictated by the fabrication process (the bearing body to be inserted in the outer sleeve cannot easily be inserted in the outer sleeve from one side because is has an overhang on the two axial ends), and not by the design and functionality of the bearing of the invention, as described above.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

LIST OF REFERENCE SYMBOLS 1 inner sleeve
1', 1" part of the inner sleeve 1, or inner sleeve section
2' bearing body, elastomer spring
3 outer sleeve
5 stop element
6 actuator
6, 6' stop face (part of an axial limit stop)
7, 7' stop face (part of an axial limit stop)
8 opening to
9 groove, channel
10 pin
11, 11' sliding disk
12, 12' sliding bushing
a axial or axial direction
s, s' spacing or gap
h height
$\Delta h$ pitch

What is claimed is:

1. An elastomer bush bearing comprising an inner sleeve (1), an elastomer bearing body (2), which surrounds the inner sleeve (1) and is connected with the inner sleeve by vulcanization and forms an elastomer spring, an outer sleeve (3) receiving the bearing body (2) with the inner sleeve (1), and at least one axial limit stop (6, 6', 7, 7'), which limits the axial compression spring travel of the bearing body (2) when oscillations are introduced axially in the bearing and which is formed by two stop faces (6, 7, 6', 7') which face each other in the axial direction (a) and are spaced apart by a gap (s, s'), wherein a first stop face (6, 6') is formed on the bearing body (2) and a second stop face (7, 7') is formed on the inner sleeve (1) or on a stop element (4, 4') supported by the inner sleeve (1), wherein the first stop face (6, 6') and the second stop face (7, 7') are rotatable relative to each other in the circumferential direction of the bearing by an actuator (5) or displaceable relative to each other in the axial direction (a), wherein their mutual separation as determined by the gap (s, s') is changeable simultaneously with a corresponding relative motion of the stop faces (6, 6', 7, 7') effected by a rotation of the actuator, wherein the inner sleeve (1) comprises two cylindrical sleeve sections (1', 1") which slidingly engage with each other and are movable relative to each other in the axial direction (a), wherein a first sleeve section (1") is connected with the bearing body (2) through vulcanization and a second sleeve section (1'), is displaceable relative to the first sleeve section (1") and therefore by a rotation of the actuator also relative to the bearing body (2) that is connected with the first sleeve section (1"), the second sleeve section (1') includes on at least one axial end the second stop face (7, 7'), which in cooperation with the first stop face (6, 6') of the bearing body (2) located opposite in the axial direction (a) forms the at least one axial limit stop (6, 6', 7, 7'), wherein the first sleeve section (1") connected with the bearing body (2) through vulcanization has on a section protruding axially from the bearing body (2) a circumferential groove (9) or channel disposed at a constant axial height (h) along at least a portion of its circumference, with a pin (10) arranged on the rotatable actuator (5) guided in the groove or channel, wherein the pin (10) protrudes through an opening (8) which extends along a portion of the circumference of the second sleeve section (1'), with the opening (8) having a pitch ($\Delta h$) relative to the axial direction (a), so that the first and second sleeve sections (1', 1") are axially displaced against each other by the pin (10) during a rotation of the actuator (5).

2. The elastomer bush bearing according to claim 1, wherein the actuator (5) is operatively connected with an electric motor that operates the actuator (5).

3. The elastomer bush bearing according to claim 2, wherein the electric motor and the actuator (5), which is operatively connected thereto, represent a portion of a control circuit, which uses sensors to measure the preload acting on the bush bearing and also the gap (s, s') between the stop faces (6, 7, 6', 7') of the at least one axial limit stop (6, 6', 7, 7'), and wherein a controlled variable is derived therefrom in a processing unit, and wherein the eleciric motor operating the actuator (5) is controlled by a controller in response to the controlled variable for adapting the spring travel to a changing preload.

4. The elastomer bush bearing according to claim 2, wherein the connection of the actuator (5) is accomplished by a gear.

5. The elastomer bush bearing according to claim 1, wherein at least two chambers which are connected by a flow channel are formed in the bearing body (2) for receiving a damping fluid.

6. The elastomer bush bearing according to claim 1, wherein the elastomer bearing body (2) is not disposed within the inner sleeve.

7. An elastomer bush bearing comprising an inner sleeve (1), an elastomer bearing body (2), which surrounds the inner sleeve (1) and is connected with the inner sleeve by vulcanization and forms an elastomer spring, an outer sleeve (3) receiving the bearing body (2) with the inner sleeve (1), and at least one axial limit stop (6, 6', 7, 7'), which limits the axial compression spring travel of the bearing body (2) when oscillations are introduced axially in the bearing and which is formed by two stop faces (6, 7, 6', 7') which face each other in the axial direction (a) and are spaced apart by a gap (s, s'), wherein a first stop face (6, 6') is formed on the bearing body (2) and a second stop face (7, 7') is formed on the inner sleeve (1) or on a stop element (4, 4') supported by the inner sleeve (1), wherein the first stop face (6, 6') and the second stop face (7, 7') are rotatable relative to each other in the circumferential direction of the bearing by an actuator (5) or displaceable relative to each other in the axial direction (a), wherein their mutual separation as determined by the gap (s, s') is changeable simultaneously with a corresponding relative motion of the stop faces (6, 6', 7, 7') effected by a rotation of the actuator, wherein the elastomer bearing body (2) includes on at least one of its axial end faces the first stop face (6, 6') having a saw tooth shape or wavy shape along the bearing circumference, wherein the second stop face (7, 7'), which is formed on the stop element (4, 4') that is supported by a corresponding axial end of the inner sleeve (1), together with the first stop face (6, 6') form the at least one axial limit stop (6, 6', 7, 7'), wherein the second stop face (7, 7') corresponds to the first stop face (6, 6') of the bearing body and also has a saw tooth shape or wavy shape in the circumferential direction, and the stop element (4, 4'), which is movable by the actuator (5) on the circumference of the inner sleeve (1), is connected to the inner sleeve (1) by a sliding disk (11, 11') and/or sliding bushing (12, 12').

8. The elastomer bush bearing according to claim 7, wherein the the at least one axial limit stop comprises two axial limit stops (6, 6', 7, 7') arranged on the respective axial ends of the bush bearing, with the gap (s, s') between their stop faces (6, 7, 6', 7') being adjustable independent of each other.

9. The elastomer bush bearing according to claim 7, wherein the inner sleeve (1) comprises two cylindrical sleeve sections (1', 1") which slidingly engage with each other and are movable relative to each other in the axial direction (a), wherein a first sleeve section (1") is connected with the bearing body (2) through vulcanization, and a second sleeve section (l') is displaceable relative to the first sleeve section (1") and therefore by a rotation of the actuator also relative to the bearing body (2) that is connected with the first sleeve section (1").

10. The elastomer bush bearing according to claim 7, wherein the second stop face (7, 7') formed on the stop element (4, 4') is made of an elastomer.

11. The elastomer bush bearing according to claim 7, wherein the actuator (5) is operatively connected with an electric motor that operates the actuator (5).

12. The elastomer bush bearing according to claim 11, wherein the electric motor and the actuator (5), which is operatively connected thereto, represent a portion of a control circuit, which uses sensors to measure the preload acting on the bush bearing and also the gap (s, s') between the stop faces (6, 7, 6', 7') of the at least one axial limit stop (6, 6', 7, 7'), and wherein a controlled variable is derived therefrom in a processing unit, and wherein the electric motor operating the actuator (5) is controlled by a controller in response to the controlled variable for adapting the spring travel to a changing preload.

* * * * *